3,248,393
1,3-DIAZAPHENOTHIAZINES AND METHOD
Barbara Roth, Scarsdale, and George H. Hitchings, Yonkers, N.Y., assignors to Burroughs Wellcome & Co. (U.S.A.) Inc., Tuckahoe, N.Y., a corporation of New York
No Drawing.  Filed June 5, 1961, Ser. No. 123,342
Claims priority, application Great Britain, June 23, 1960, 21,951/60; Oct. 28, 1960, 37,224/60
3 Claims.  (Cl. 260—243)

The subject of this invention is a novel group of 1,3-diazaphenothiazines represented by Formula I wherein R and R' are selected from the class consisting of the

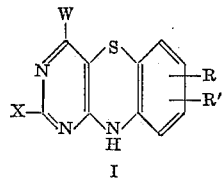

I lower alkyl groups, the lower alkoxy groups, halogen, and hydrogen. W is selected from the class consisting of hydroxyl, lower alkyl, amino and hydrogen, and X is selected from the class consisting of the hydrazino, amino, alkylamino, dialkylamino, hydroxyl, lower alkoxyl, mercapto and lower alkylmercapto groups, halogen and hydrogen. When X is dialkylamino, the alkyl groups may be joined so that dialkylamino is a heterocyclic amino radical including piperidino, pyrrolidino, morpholino, and N'-alkylpiperazino.

The compounds possess antibacterial activity against a number of pathogenic microorganisms including *Streptococcus faecalis, Escherichia coli, Staphylococcus aureus, Proteus vulgaris* and *pseudomonas aeruginosa.* The compounds are therefore useful as topical antibacterial agents for the control of superficial infections with the above and other susceptible microorganisms. The compounds may be applied as solutions, ointments and powders. Concentrations of the order of 1 mg./ml. (0.1%) are strongly antibacterial, however, since solutions do not produce tissue damage or irritation at much higher concentrations, the actual concentration employed for a given purpose may be as high as 2%, although the preferred concentration is generally in the range of 0.1–1%.

The compounds generally have depressant action of the tranquilizer type when given orally to mice. It will be observed that the diazaphenothiazine system is related to phenothiazine (from which are derived a number of known anti-histaminics and tranquilizers), to the purines and pyrimidines, of great metabolic importance, to the pteridines and to the isoalloxazines II, such as riboflavin (II, R=ribityl). Exemplary of such compounds are those having the formula:

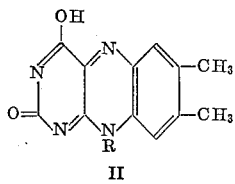

II

The compounds of Formula I are prepared from 4-hydroxy-5-(o-aminophenylmercapto) pyrimidines, III, which can be obtained readily by the reaction of an o-aminothiophenol with a 4-hydroxy-5-bromopyrimidine in alkaline solution.

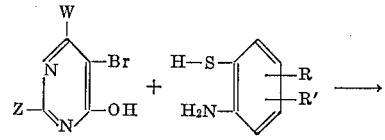

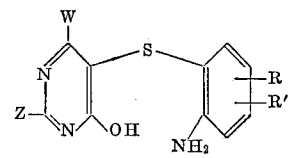

III

In these formulae, R, R' and W have the same values as above, and Z is selected from the class consisting of the amino, alkylamino, dialkylamino, hydroxyl and mercapto groups.

The compounds III may then be cyclized to I by either of two routes. The first route involves warming with phosphorus oxychloride. The 4-hydroxyl group may be replaced by chlorine with subsequent cyclization; however, this mechanism is not proved. This process often results in phosphorylated products which require hydrolysis, for which reason it is preferable to acetylate before the phosphorus oxychloride treatment.

The second route, which is vastly preferable, and whose feasibility is most surprising, consists of heating III in acid solution. The acid employed is conveniently hydrochloric acid but other strong acids such as sulfuric, phosphoric and perchloric acids are satisfactory. The solution may be aqueous or alcoholic or a mixture of the two. The concentration of acid is not especially critical except as regards the rate. There should be at least one equivalent of acid for each basic function. For a satisfactory rate, the pH of the reaction-mixture should be below 3 and preferably below 2. After one to 18 hours at reflux (depending on the compound, the temperature and the pH) cyclization is effectively complete and the products are obtained in excellent yields. During this process, if W is an amino group, it tends to be hydrolyzed, wherefore mixtures are frequently obtained of 4-hydroxy and 4-amino compounds.

Certain variants of X in the 1,3-diazaphenothiazines, I, are preferably introduced after formation of the tricyclic ring system. Thus the following sequence provides the variants X=Cl, NHNH$_2$ and H and also affords an alternative route to certain compounds with X=alkylamino or dialkylamino.

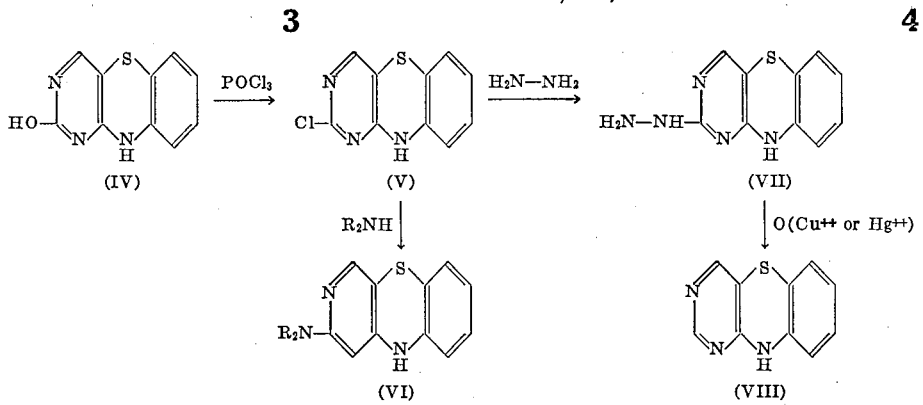

Similarly, an amino group may be introduced in the 4-position as shown in the following scheme.

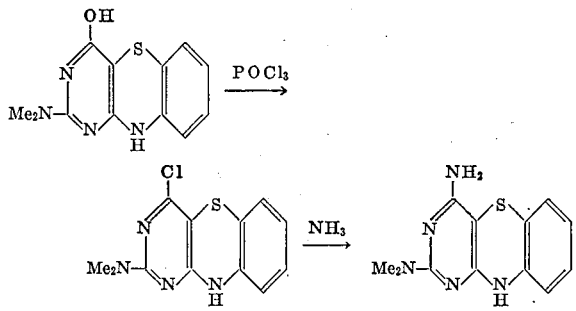

The substituents permissible in the benzenoid ring are such as do not interfere in the above processes and are not affected thereby. Halogen, lower alkyl groups and lower alkoxyl groups are obvious and acceptable values.

Where the substituents X or W are amino, the compounds have markedly basic properties and form stable addition salts. Such salts are considered to be equivalents of the free bases.

EXAMPLE 1

2-amino-1,3-diazaphenothiazine

A mixture of 19.0 g. of 5-bromoisocytosine, 12.5 g. of o-aminothiophenol, 13.8 g. of potassium carbonate, and 175 ml. of ethylene glycol was heated at 150° for two hours in an atmosphere of nitrogen. The mixture was then chilled, filtered from slight impurities, and poured into several volumes of water. An oil separated, which was extracted with ether. The aqueous solution was then neutralized and yielded an almost white precipitate. This was filtered, and washed with water, alcohol, and ether, followed by reprecipitation from alkali, and then from acid. There was thus obtained 2-amino-4-hydroxy-5-(o-aminophenylmercapto)-pyrimidine, melting at 259°, and with ultraviolet absorption maxima at 292 m$\mu$ at pH 11; and at 230 m$\mu$ with a shoulder at 275 m$\mu$ at pH 1.

One gram of the above product was mixed with 10 ml. of acetic anhydride and 0.1 ml. of pyridine and heated on the steam bath for 45 minutes. Only partial solution occurred. Then 10 ml. of additional acetic anhydride was added, and the mixture was heated to refluxing for ten minutes, at which time all but a trace was in solution. The mixture was filtered, and cooled, yielding a crystalline precipitate. This was recrystallized from alcohol, which yielded a white acetyl derivative melting at 224–226°.

A mixture of 0.75 g. of the above acetyl derivative and 15 ml. of phosphorus oxychloride was refluxed for 15 minutes, at which time all was in solution. The excess phosphorus oxychloride was distilled off, and the residue poured on ice, and neutralized with ammonia. A cream-colored solid precipitated. This was filtered off, and placed in a flask with 10 ml. of alcohol, 1 ml. of concentrated hydrochloric acid, and 2 ml. of water. This mixture was heated on the steam bath for 1.25 hours, yielding a clear solution. After cooling, the solution was rendered basic with sodium hydroxide which yielded a cream-colored precipitate. This was recrystallized from a mixture of alcohol and ether yielding yellow crystals that melted at 235° C. This product, 2-amino-1,3-diazaphenothiazine, had ultraviolet absorption maxima at 240.5 m$\mu$, 269 m$\mu$ and 380 m$\mu$ at pH 1, and at 240.5 m$\mu$ and 318 m$\mu$ at pH 11.

This substance could alternatively be prepared as a phosphate derivative by treating 2-amino-4-hydroxy-5-(o-aminophenylmercapto)pyrimidine directly with phosphorus oxychloride, rather than as the acetyl derivative. Thus, 2 g. of the pyrimidine refluxed with 20 ml. of phosphorus oxychloride for one hour yielded a clear solution. This was concentrated, poured on ice, and neutralized with ammonia. A yellow product was formed which was soluble in sodium hydroxide but not in acid. It was not soluble in alcohol, glycol, dimethylformamide or other common organic solvents, with the exception of dimethylsulfoxide. This product had the same spectrum as the above diazaphenothiazine, with a 30% decrease in optical densities. It did not contain halogen. These results, plus analytical data, indicated the addition of a —PO(OH)$_2$ radical to the diazaphenothiazine molecule.

EXAMPLE 2

A mixture of 16 g. 2-amino-5-o-aminophenylthio-4-hydroxy pyrimidine, 320 ml. 95% ethanol and 32 ml. concentrated hydrochloric acid was heated on the steam bath under reflux for six hours. A clear yellow solution was formed, which upon cooling yielded a heavy yellow crystalline precipitate. This was isolated and recrystallized from alcohol with the addition of a little hydrochloric acid. There was thus obtained 2-amino-1,3-diazaphenothiazine hydrochloride, melting at 236–238°, with an ultraviolet absorption spectrum showing maxima in 0.1 N hydrochloric acid at 240, 269, shoulder 280 and 380 m$\mu$, and at pH 11 at 240 and 318 m$\mu$.

EXAMPLE 3

A mixture of 19.1 g. 5-bromouracil, 12.5 g. o-aminobenzenethiol, 13.8 g. anhydrous potassium carbonate, and 175 ml. ethylene glycol was heated to 150° under nitrogen for two hours. After cooling, the mixture was then poured into several volumes of ice-water, clarified, and neutralized. The resultant precipitate was isolated, and extracted with warm ethanol to remove yellow impurities. There was thus obtained 5-o-aminophenylthio-2,4-dihydroxypyrimidine, melting at 247–249°.

To this pyrimidine (14.7 g.) was added 300 ml. ethanol and 30 ml. concentrated hydrochloric acid. The mixture was heated on the steam bath under reflux for 16 hours, resulting in the precipitation of a yellow matte of needles consisting of 2-hydroxy-1,3-diazaphenothiazine. This substance may be purified as the sodium salt by dissolving in hot dilute sodium hydroxide plus a little ethanol. On cooling it crystallized as fine yellow needles. The substance did not melt below 380°. It had ultraviolet absorption maxima at 265, 305, and 405 m$\mu$ in 0.1 N hydrochloric acid, and at 254 and 310 m$\mu$ in pH 11 buffer.

EXAMPLE 4

20 g. 2-dimethylamino-4-hydroxy-6-methylpyrimidine was dissolved in 300 ml. glacial acetic acid, and to this was slowly added a solution of 6.76 ml. bromine in 100 ml. glacial acetic acid. A precipitate of 5-bromo-2-dimethylamino - 4-hydroxy-6-methylpyrimidine hydrobromide separated. This was isolated and converted to the free base in water, by the addition of sodium hydroxide. The melting point was then 232–233°.

A mixture of 11.59 g. 2-dimethylamino-4-hydroxy-5-bromo-6-methylpyrimidine, 6.25 g. o-aminobenzenethiol, 6.9 g. potassium carbonate, and 85 ml. ethylene glycol was heated under nitrogen to 140° for two hours. After cooling, the reaction mixture was poured into water, clarified, and neutralized. The precipitated product was isolated and recrystallized from ethanol, yielding long needles of 5 - o-aminophenylthio-2-dimethylamino-4-hydroxy-6-methylpyrimidine melting at 216°.

A 4.4 g. sample of this pyrimidine was heated on the steam bath for two hours with 90 ml. ethanol and 9 ml. hydrochloric acid. On cooling, a yellow crystalline product separated, which was recrystallized from ethanol. The substance, 2 - dimethylamino - 4 - methyl - 1,3 - diazaphenothiazine hydrochloride, M.P. 218–220°, had ultraviolet absorption maxima at 248, 281 and 380 m$\mu$ in 0.1 N-hydrochloric acid, and at 253, 312 and 340 m$\mu$ at pH 11.

EXAMPLE 5

A mixture of 46 g. of 2-methylthiouracil and 36 g. of N-methylpiperazine was heated at 150° for three hours, which yielded a clear solution from which methylmercaptan was evolved. Upon cooling, the product solidified. It was ground and washed with ether, followed by recrystallization first from absolute ethanol and then from ethyl acetate. There was thus obtained 2-(4'-methylpiperazino)-4-hydroxy-pyrimidine, melting at 185–186°. This product was brominated in glacial acetic acid, as described in Example 4, which precipitated 2-(4'-methylpiperazino)-4-hydroxy-5-bromopyrimidine hydrobromide; this melted at 280–282° (dec.) after recrystallization from ethanol.

A mixture of 53.1 g. of the above pyrimidine hydrobromide salt, 31.2 g. potassium carbonate, 18.8 g. of o-aminothiophenol, 240 ml. water, and 240 ml. ethanol was heated on the steam bath for 2.5 hours. Upon cooling, a yellow precipitate of o,o'-diaminodiphenyl disulfide separated, which was filtered off. The filtrate was distilled to dryness under vacuum. A mixture of 450 ml. of ethanol and 60 ml. of concentrated hydrochloric acid was added to the residue, and the resultant solution was heated under reflux for 20 hours. Upon chilling, a greenish-yellow precipitate separated. This was slurried in warm dilute hydrochloric acid, and filtered from a small amount of insoluble material. The solution was then made alkaline with sodium hydroxide, which precipitated a greenish gum. This was separated and washed with repeated portions of ice water, at which point it solidified. After three recrystallizations from 50% ethanol with the aid of decolorizing charcoal there was obtained 2-(4'-methylpiperazino) - 1,3-diazaphenothiazine, melting at 141°. The substance had ultraviolet absorption maxima at 245, 276, and 385 m$\mu$ in 0.1 N HCl, and at 253 and 322 m$\mu$ in 95% ethanol.

EXAMPLE 6

A mixture of 35.4 g. of 2-(4'-methylpiperazino)-4-hydroxy-5-bromopyrimidine hydrobromide, 34 g. potassium carbonate, 19.6 g. 2-amino-4-chlorothiophenol hydrochloride, and 340 ml. of 50% ethanol was heated under reflux for 2.5 hours. Upon cooling, a precipitate formed which appeared to be a mixture of yellow and white products. This was isolated and slurried in dilute sodium hydroxide; the yellow material remained insoluble, and was filtered off and discarded. The solution was neutralized, yielding a white precipitate. Upon recrystallization from ethanol, there was obtained 2-(4' - methylpiperazino) - 4 - hydroxy - 5 - (2" - amino-4"-chlorophenylthio)pyrimidine, melting at 226–228°.

Eleven grams of the above product were mixed with 250 ml. of ethanol and 12 ml. of concentrated hydrochloric acid, and heated on the steam bath for 17 hours. A heavy yellow precipitate formed. This was isolated and dissolved in warm dilute hydrochloric acid, followed by filtration from a small amount of insoluble material. Upon neutralization, a pale yellow precipitate was formed, which was purified by recrystallization from ethanol, with the aid of decolorizing charcoal. There was thus obtained 2 - (4' - methylpiperazino) - 8 - chloro - 1,3 - diazaphenothiazine, melting at 201–203°. The substance had ultraviolet absorption maxima at 249, 277, and 390 m$\mu$ in 0.1 N HCl, and at 256 and 326 m$\mu$ in 95% ethanol.

EXAMPLE 7

Using procedures described in Example 5, there was prepared 2 - (4' - methylpiperazino) - 4 - hydroxy - 6 - methylpyrimidine, by reacting 6-methyl-2-methylthiouracil with N-methylpiperazine. The product melted at 154–155° after recrystallization from ethyl acetate. Upon bromination as described in Example 4, there was obtained 2 - (4' - methylpiperazino) - 4 - hydroxy - 5 - bromo - 6 - methylpyrimidine hydrobromide, which melted at 274–275° (dec.) after recrystallization from water.

Following the procedure of Example 5, the above pyrimidine was reacted with o-aminothiophenol, followed by cyclization with acid. The product was isolated as the free base, followed by conversion to the hydrochloride salt and crystallization from ethanol. There was thus obtained 2 - (4' - methylpiperazino) - 4 - methyl - 1,3-diazaphenothiazine dihydrochloride dihydrate, which melted at 274–274.5° (dec.). The substance had ultraviolet absorption maxima at 247, 275 and 385 m$\mu$ in 0.1 N HCl, and at 253 and 324 m$\mu$ in pH 11 buffer.

EXAMPLE 8

A mixture of 20 g. of 2-hydroxy-1,3-diazaphenothiazine and 300 ml. of phosphorus oxychloride was heated under reflux for five hours, after which it was filtered from a small amount of dark red material. The excess phosphorus oxychloride was distilled off, and the product poured on ice and neutralized with sodium carbonate. An orange-yellow precipitate was obtained, which was isolated and purified by sublimation in vacuo at 190–200°, followed by recrystallization from ethylene glycol monomethyl ether. There was thus obtained 2-chloro-1,3-diazaphenothiazine, which melted at 282°. The substance had ultraviolet absorption maxima at 251 and 355 m$\mu$ in 95% ethanol.

EXAMPLE 9

Using the method of Example 5, 2-methylthiouracil was reacted with dimethylaminopropylamine. The glassy product was brominated in glacial acetic acid, yielding 2 -(3' - dimethylaminopropylamino) - 4 - hydroxy - 5-bromopyrimidine hydrobromide monohydrate, which melted at 128–129° after recrystallization from ethanol. Again using the procedure of Example 5, the product was reacted with o-aminothiophenol in the presence of potassium carbonate, yielding a syrupy product which was cyclized with hydrochloric acid in ethanol. The product was isolated as the free base, obtained as a gum which slowly crystallized. Upon recrystallization from 50% ethanol there was obtained 2-(3'-dimethylaminopropylamino) - 1,3 - diazaphenothiazine, melting at 133–134°. The substance had ultraviolet absorption maxima at 242.5, 275 and 385 m$\mu$ in 0.1 N HCl, and at 245 and 317.5 m$\mu$ at pH 11.

EXAMPLE 10

A mixture of 1 g. of 2-chloro-1,3-diazaphenothiazine and 5 ml. of 3-dimethylaminopropylamine was heated in an oil bath at 145–150° for two hours, which yielded a clear solution. The excess amine was distilled off under vacuum, and the residue mixed with cold water. A gum separated which solidified on standing. Upon recrystallization from dilute ethanol there was obtained 2-(3'-dimethylaminopropylamino)-1,3 - diazaphenothiazine, having the same physical constants as described in Example 9.

EXAMPLE 11

Using the technique of Example 10, 2-dimethylaminoethylamine was reacted with 2-chloro-1,3-diazaphenothiazine to produce 2-(2'-dimethylaminoethylamino)-1,3-diazaphenothiazine, melting at 142°.

EXAMPLE 12

From the reaction of 2-methylthiouracil and piperidine, according to the method of Example 5, there was obtained 2-piperidino-4-hydroxypyrimidine, which melted at 156–157° after recrystallization from ethyl acetate, followed by sublimation. By bromination in glacial acetic acid, followed by conversion of the resultant salt to the free base and recrystallization from 50% ethanol, there was obtained 2-piperidino - 4 - hydroxy - 5 - bromopyrimidine, which melted at 201–202°. This product was treated with o-aminothiophenol according to the technique of Example 5, followed by cyclization with acid, to produce 2 - piperidino - 1,3 - diazaphenothiazine, which melted at 142–144° after recrystallization from 95% ethanol.

EXAMPLE 13

2-methylthiouracil was treated with morpholine, following the technique of Example 5, to produce 2-morpholino-4-hydroxypyrimidine, which melted at 169–170° after recrystallization from a 60:40 hexane-ethanol mixture. Upon bromination as before followed by recrystallization of the product from ethanol, there was obtained the free base, 2-morpholino-4-hydroxy-5-bromopyrimidine, which melted at 238–241°. This was treated with o-aminothiophenol as in Example 5, followed by cyclization in acid, to yield 2-morpholino-1,3-diazaphenothiazine, which melted at 177–179° after recrystallization from ethanol.

EXAMPLE 14

A mixture of 13.1 g. of 2-morpholino-4-hydroxy-5-bromopyrimidine, 10.4 g. of potassium carbonate, 9.8 g. of 2-amino-4-chlorothiophenol hydrochloride, 125 ml. ethanol and 80 ml. of water was heated under reflux for four hours, filtered from a small inorganic precipitate, and chilled. Upon chilling, yellow crystals consisting of the disulfide of the mercaptan separated. These were filtered off, and the filtrate was concentrated and diluted with water, followed by neutralization, which precipitated a grayish-white product. This was reprecipitated from alkaline solution, followed by recrystallization from 95% alcohol. There was thus obtained as a monohydrate 2-morpholino-4-hydroxy-5-(2'-amino-4' - chlorophenylthio) pyrimidine, which melted at 237–239°. This substance had a slight ultraviolet absorption maximum at 240 m$\mu$ and a shoulder at 288 m$\mu$ in 0.1 N HCl, and a slight maximum at 249 m$\mu$ and a maximum at 301 m$\mu$ at pH 11. Eight grams of this product was mixed with 200 ml. of ethanol and 6 ml. of concentrated hydrochloric acid, and heated on the steam bath for 17 hours. The hot solution was filtered from a slight precipitate and chilled, which resulted in the separation of a bright yellow precipitate. This was filtered off and slurried in dilute sodium hydroxide, which yielded a pale yellow insoluble material. Upon recrystallization from ethanol there was obtained 2-morpholino-8 - chloro - 1,3 - diazaphenothiazine, which melted at 193°. This product had ultraviolet absorption maxima at 252, 282, and 390 m$\mu$ in 0.1 N HCl, and at 257, and 325 m$\mu$ in 95% ethanol.

EXAMPLE 15

6-methyl-2-methylthiouracil was treated with morpholine as in Example 5, to yield 2-morpholino-4-hydroxy-6-methylpyrimidine, which melted at 223–226° after sublimation. Upon reaction with bromine in glacial acetic acid, there was formed 2-morpholino-4-hydroxy-5-bromo-6-methylpyrimidine, which melted at 240–243° after recrystallization from ethanol. Upon treatment with 2-amino-4-chlorothiophenol as in Example 14, there was obtained 2-morpholino-4-hydroxy-5-(2'-amino-4'-chlorophenylthio)-6-methylpyrimidine, which melted at 228° after recrystallization from ethanol. This was cyclized with acid as in Example 14, thus producing 2-morpholino-4-methyl-8-chloro-1,3-diazaphenothiazine, which melted at 234° after recrystallization from ethanol. This substance had ultraviolet absorption maxima at 251, 283, and 385 m$\mu$ in 0.1 N HCl, and at 257 and 327 m$\mu$ in 95% ethanol.

EXAMPLE 16

2-piperidino-4-hydroxy-5-bromopyrimidine was treated with 2-amino-4-chlorothiophenol as described in Example 14 to produce 2-piperidino-4-hydroxy-5 - (2' - amino - 4'-chlorophenylthio(pyrimidine, which was purified by reprecipitating twice from alkaline solution, followed by recrystallization from ethanol. It then melted at 226–228°, and had the following ultraviolet absorption spectrum: in 0.1 N HCl, there was a shoulder at 235 m$\mu$ and a slight maximum at 285 m$\mu$; at pH 11 there were maxima at 252 and 303 m$\mu$. This product was cyclized as in Example 14, which yielded 2-piperidino-8-chloro-1,3-diazaphenothiazine, melting at 165–167° after recrystallization from ethanol. The product had ultraviolet absorption maxima at 255, 291, and 385 m$\mu$ in 0.1 N HCl, and at 231, 257, and 325 m$\mu$ in 95% ethanol.

EXAMPLE 17

2-piperidino-4-hydroxy - 6 - methylpyrimidine was brominated according to the technique of Example 4, which produced 2-piperidino-4-hydroxy-5-bromo - 6 - methylpyrimidine, melting at 242–243° after recrystallization from ethanol. This compound was reacted with 2-amino-4-chlorothiophenol, following the method of Example 14, to produce 2-piperidino-4-hydroxy-5-(2'-amino-4'-chlorophenylthio)-6-methylpyrimidine, which crystallized from the reaction mixture. It was purified by precipitating from alkaline solution, followed by recrystallization from ethanol, and then melted at 218–220°. The ultraviolet absorption spectrum had the following characteristics: in 0.1 N HCl, there were shoulders at 239 and 280 m$\mu$; at pH 11, there were maxima at 256 and 302.5 m$\mu$. This compound was cyclized as in Example 14, which pricipitated the bright yellow hydrochloride salt of 2-piperidino-4-methyl-8-chloro-1,3 - diazaphenothiazine. This melted at 219–221° after recrystallization from ethanol, and had ultraviolet absorption maxima at 255, 285, and 385 m$\mu$ in 0.1 N HCl, and at 232, 258, and 325 m$\mu$ at pH 11.

EXAMPLE 18

A mixture of 63.3 g. of 5-bromouracil, 65.3 g. of 2-amino-4-chlorothiophenol hydrochloride, 69 g. of potassium carbonate, and 475 ml. of ethylene glycol was slowly heated to 120° in an atmosphere of nitrogen, and held at this temperature for one hour. After cooling, the product was poured into several volumes of water, thus precipitating the disulfide of the mercaptan. The mixture was filtered, and the filtrate neutralized with acetic acid. The resultant precipitate was filtered off and washed well with ethanol. It was then reprecipitated twice from alkali, followed by recrystallization from ethylene glycol monomethyl ether, thus producing 2,4-dihydroxy-5-(2'-amino-4'-chlorophenylthio)pyrimidine, which had a slight ultraviolet absorption maximum at 274 m$\mu$ at pH 1, and 299 m$\mu$ at pH 11. Seventeen grams of this product was mixed with 385 ml. ethanol plus 38.5 ml. of concentrated hydrochloric acid, and heated on the steam bath for 16 hours. At first a white precipitate was present, but this gradually turned yellow. The mixture was cooled and filtered, and the precipitate was then extracted with warm dilute sodium hydroxide, in which the product was quite insoluble, despite the fact that it contained a hydroxyl group; however, residual starting material dissolved, and was thus removed. This extraction was repeated, and the insoluble portion washed well then with water and ethanol. There was thus obtained 2-hydroxy-8-chloro-1,3-diazaphenothiazine, which had ultraviolet absorption maxima at 239, 255 (shoulder), 265, and 305 m$\mu$ in ethanol.

EXAMPLE 19

2-hydroxy-8-chloro-1,3-diazaphenothiazine was chlorinated as described in Example 8, and also purified by the same technique, which yielded 2,8-dichloro-1,3-diazaphenothiazine. This decomposed between 270–280° in a sealed tube, and had ultraviolet absorption maxima at 255 and 340 m$\mu$ in 95% ethanol.

EXAMPLE 20

Two grams of 2-chloro-1,3-diazaphenothiazine was dissolved in 80 ml. of hot ethylene glycol monomethyl ether. To this was then added 6.5 ml. of 85% hydrazine hydrate. Almost immediately a shiny yellow precipitate began to form. Heating under reflux was continued for 20 minutes, after which the mixture was cooled, and the product isolated by filtration. This was purified by dissolving in acid, followed by filtration from a trace of acid-insoluble material, neutralization, and recrystallization from ethylene glycol monomethyl ether. There was thus obtained 2-hydrazino-1,3-diazaphenothiazine, melting at 287° The substance had ultraviolet absorption maxima at 242, 267, 305 (shoulder), and 385 m$\mu$ in 0.1 N HCl, and at 244 and 318 m$\mu$ at pH 11.

EXAMPLE 21

A mixture of five grams 2-chloro-1,3-diazaphenothiazine, 100 ml. methanol and 1.26 g. sodium methylate was heated under reflux for 16 hours, after which it was chilled and the light yellow precipitate isolated. This was recrystallized from methanol, which yielded 2-methoxy-1,3-diazaphenothiazine, melting at 204–205°. The substance had ultra-violet absorption maxima at 237, 263, 274 (shoulder), 315, and 395 m$\mu$ in 0.1 N HCl, and at 237.5, 251, and 312 m$\mu$ at pH 11.

EXAMPLE 22

To a solution of two grams 2-chloro-1,3-diazaphenothiazine in 80 ml. hot ethylene glycol monomethyl ether was added a solution of 1.6 g. p-toluenesulfonhydrazide in 20 ml. of ethylene glycol monomethyl ether plus 2.5 ml. 10% alcoholic HCl. The mixture was boiled for 1.5 hours, and then cooled, which yielded a small yellow precipitate of recovered starting material. To the filtrate was added 50 ml. of 3 N sodium hydroxide, which yielded a dark green solution. This was heated on the steam bath for 45 minutes, cooled, and poured into ice water, which yielded a gray precipitate. This was extracted with dilute acid, and filtered from insoluble material. The acid solution was then made basic, which yielded a cream-colored precipitate. This was found to be a mixture of two substances, one of which was considerably more soluble in alcohol than the other. The least soluble fraction, after repeated recrystallization from ethanol, melted at 166–167°, and had the constitution of 2-($\beta$-methoxyethoxy) - 1,3 - diazaphenothiazine; ultraviolet absorption maxima were at 237, 264, 274 (shoulder), 310, and 395 m$\mu$ in 0.1 N HCl, and at 239, 252.5, and 320 m$\mu$ in ethanol. The more soluble fraction, recovered by adding water to the alcoholic mother liquors, followed by recrystallization from a hexane-benzene-ethanol mixture, melted at 176–178°, and had the constitution 1,3-diazaphenothiazine; its ultraviolet absorption maxima were at 258, 315, and 360 (slight) m$\mu$ in 0.1 N HCl, and at 249 and 340 m$\mu$ at pH 11.

EXAMPLE 23

One gram of 2-hydrazino-1,3-diazaphenothiazine was dissolved in 60 ml. of warm 0.1 N HCl, and heated to the boil. To this solution was added dropwise a solution of 30 ml. of 10% copper sulfate pentahydrate. A brown precipitate formed. Heating was continued for 30 minutes, after which the mixture was cooled and filtered. The precipitate, a copper complex, was dissolved in dilute acid, and treated with hydrogen sulfide, which yielded a black precipitate. The warm mixture was filtered, and the filtrate neutralized, which yielded a light gray precipitate. Upon recrystallization from a hexane-benzene-ethanol mixture there was obtained 1,3-diazaphenothiazine, identical in properties with the product of Example 22.

EXAMPLE 24

A mixture of 0.5 g. of 2-chlorodiazaphenothiazine, 0.16 g. of thiourea, and 20 ml. of ethylene glycol monomethyl ether was heated to reflux temperature for three hours. A yellow precipitate was present at the boil. The warm solution was filtered, yielding a bright yellow precipitate of 2-mercapto-1,3-diazaphenothiazine, which melted at 272–274° (dec.). This product had an ultraviolet absorption maximum at 274 m$\mu$ and a bend out at 310 m$\mu$ with slight shoulder at 340 m$\mu$, in pH 11 buffer.

EXAMPLE 25

A mixture of 2.2 g. 5-bromo-2-thiouracil, 2.76 g. potassium carbonate, 1.3 g. 2-aminothiophenol, and 20 ml. of ethylene glycol was heated to 140° for one hour, poured in water, extracted with ether, and the aqueous fraction neutralized with acetic acid. A light gray precipitate separated, which was isolated and washed with ethanol. The product was then mixed with 5 ml. of ethanol and 0.15 ml. of concentrated hydrochloric acid, and refluxed for 21 hours. A yellow precipitate was obtained, which was isolated and washed well with water, ethanol, and ether. There was obtained 2-mercapto-1,3-diazaphenothiazine, having properties identical with those of Example 24.

EXAMPLE 26

Fifteen grams of 2-dimethylamino-4-hydroxy-6-aminopyrimidine was slurried in 350 ml. of carbon tetrachloride, and 5 ml. of bromine in 100 ml. of carbon tetrachloride was added dropwise to the well-stirred suspension. The bromine was taken up quite rapidly, despite the insolubility of the pyrimidine. The product was filtered off and purified by dissolving in water, treating with charcoal, clarifying, and neutralizing with sodium bicarbonate, which yielded a white precipitate. This was then recrystallized from water, yielding 2-dimethylamino-4-hydroxy-5-bromo-6-aminopyrimidine; melting point, 232–234° (dec.). This product (11.6 g.) was mixed with 4.2 g. of sodium bircarbonate, 6.25 g. of o-aminothiophenol, and 200 ml. of 50% ethanol, and heated on the steam bath for four hours. As first, a clear solution was present, which soon deposited a cream-colored precipitate. The mixture was cooled, and the product isolated and washed well with ethanol to remove small quantities of disulfide. It was purified by recrystallization from Cellosolve, to give 2-dimethylamino-4-hydroxy-5-(2'-aminophenylthio)-6-aminopyrimidine, melting at 275–280°. A 5.5 g. sample of this product was mixed with 100 ml. of ethanol, 25 ml. water, and 3.3 ml. of concentrated hydrochloric acid, and heated on the steam bath for 19 hours. A yellow precipitate was formed, which was isolated and extracted with alkali. Part of the product was alkali-soluble. The two fractions were separated by filtration, and reconverted to the hydrochloride salts, which were then recrystallized from ethanol. There were thus obtained the hydrochlorides of 2-dimethylamino-4-amino-1,3-diazaphenothiazine and 2-dimethylamino-4-hydroxy-1,3-diazaphenothiazine, respectively.

EXAMPLE 27

2-(4'-methylpiperazino) - 4-hydroxy-5-bromo-6-methylpyrimidine hydrobromide was reacted with 2-amino-4-chlorothiophenol in the presence of potassium carbonate according to the procedure of Example 5. The solvent was partially removed under vacuum, and the residue chilled, which resulted in the precipitation of a mixture of yellow and white solids. After isolation, the mixture was extracted with dilute sodium hydroxide. Neutralization of the soluble fraction yielded a white precipitate, which after recrystallization from ethanol yielded 2-(4'-methylpiperazino)-4-hydroxy - 5 - (2''-amino-4''-chlorophenylthio)-6-methylpyrimidine as white needles melting at 229–232°. The substance had the following ultraviolet absorption characteristics: in 0.1 N HCl, there were shoulders at 245 and 290 m$\mu$, and at pH 11 there were maxima at 254 and 298 m$\mu$. The pyrimidine (54 g.) was then cyclized in 1500 ml. ethanol containing 75 ml. of concentrated hydrochloric acid by heating for 20 hours. The solution was distilled to dryness, and the residue treated with dilute sodium hydroxide, which yielded a greenish-yellow solid. This could be purified by recrystallization from dilute ethanol, which yielded 2-(4'-methylpiperazino) - 4 - methyl - 8 - chloro-1,3-diazaphenothiazine, melting at 135–136°. Ultraviolet absorption maxima were at 248, 278, and 385 m$\mu$ in 0.1 N HCl, and at 258 and 325 m$\mu$ in 95% ethanol.

EXAMPLE 28

2-amino-4,6-dihydroxy-5-bromopyrimidine was treated with o-aminothiophenol according to the procedure of Example 5 to produce 2-amino-4,6-dihydroxy-5-(2'-aminophenylthio)-pyrimidine. This product (5 g.) was cyclized by heating for 24 hours in a mixture of 100 ml. ethanol and 5 ml. concentrated hydrochloric acid. The precipitate present at the end of this time was filtered off, and found to be a mixture of cyclized and uncyclized pyrimidines. The yellow filtrate was concentrated to remove solvent. A yellow precipitate then separated, which was recrystallized from ethanol plus HCl, yielding 2-amino-4-hydroxy-1,3-diazaphenothiazine hydrochloride. This substance had an ultraviolet absorption maximum at 255 m$\mu$, a bend out at 295, shoulder at 310, and a slight maximum at 370 m$\mu$ in 0.1 N HCl, and a maximum at 256 m$\mu$ and bend out at 295 m$\mu$ in pH 11 buffer.

EXAMPLE 29

2,4-diamino-5-bromo-6-hydroxypyrimidine was reacted with o-aminothiophenol according to the procedure of Example 5, to produce 2,4-diamino-5-(2'-aminophenylthio)-6-hydroxypyrimidine, which melted at 281–284° (dec.) after reprecipitation from alkali and extraction with ethanol to remove byproducts. This substance was cyclized by heating 2.5 g. in 60 ml. of 0.33 N hydrochloric acid for three hours. The solution yielded a yellow precipitate on cooling, which turned green in the presence of air. The product was soluble in alkali and proved to be a mixture of hydroxy- and aminohydroxy-diazaphenothiazines.

EXAMPLE 30

Sodamide was freshly prepared from 0.115 g. of sodium plus approximately 5 ml. of liquid ammonia, to which a trace of ferric nitrate had been added. When the blue color had disappeared, 10 ml. of dry xylene was added, and the ammonia was allowed to evaporate. This was followed by the addition of 1 g. of 2-methoxy-1,3-diazaphenothiazine. The mixture was heated under reflux for one hour in an atmosphere of nitrogen, and then a solution of 3-dimethylaminopropyl chloride in 8 ml. of xylene (prepared from 0.87 g. of the corresponding hydrochloride which had been dissolved in water, neutralized with sodium bicarbonate, and then extracted with the xylene and dried) was added, and the mixture was refluxed in an atmosphere of nitrogen for 1.5 hours. The yellow solid was then filtered off; this proved to be recovered 2-methoxy-1,3-diazaphenothiazine. The xylene solution was then extracted with dilute hydrochloric acid; neutralization of the acid extract precipitated a yellow gum which did not solidify. This was isolated and dissolved in alcohol, followed by the addition of alcoholic HCl. A yellow solid precipitated, which was recrystallized from ethanol, thus yielding 2-methoxy-10-(3'-dimethylaminopropyl) - 1,3 - diazaphenothiazine hydrochloride, melting at 135–136°.

What we claim is:
1. 2-(N'-methylpiperazino)-4-methyl-1,3-diazaphenothiazine.
2. 2-hydrazino-1,3-diazaphenothiazine.
3. 2-amino-1,3-diazaphenothiazine.

References Cited by the Examiner

UNITED STATES PATENTS

| 2,789,978 | 4/1957 | Rath | 260—243 |
| 2,974,139 | 3/1961 | Schuler et al. | 260—243 |

FOREIGN PATENTS

| 549,055 | 12/1956 | Belgium. |
| 1,110,651 | 7/1961 | Germany. |
| 848,737 | 9/1960 | Great Britain. |

OTHER REFERENCES

Curd et al.: J. Chem. Soc., 1946, pages 343–4.
Druey: Angew. Chem., volume 70, pages 5 and 10–11 (1958).
Olmsted et al.: J. Org. Chem., volume 26, No. 6, pages 1901–7 (June 1961).

WALTER A. MODANCE, *Primary Examiner.*
IRVING MARCUS, JOHN D. RANDOLPH,
*Examiners.*